United States Patent
Hundscheidt et al.

(10) Patent No.: US 7,499,466 B2
(45) Date of Patent: Mar. 3, 2009

(54) MULTICAST GROUP MANAGEMENT IN TELECOMMUNICATION NETWORKS

(75) Inventors: Frank Hundscheidt, Kerkrade (NL); Ralf Keller, Wuerselen (DE); Thorsten Lohmar, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 649 days.

(21) Appl. No.: 10/487,755

(22) PCT Filed: Aug. 10, 2002

(86) PCT No.: PCT/EP02/08981

§ 371 (c)(1), (2), (4) Date: Jul. 29, 2004

(87) PCT Pub. No.: WO03/021838

PCT Pub. Date: Mar. 13, 2003

(65) Prior Publication Data

US 2004/0246984 A1 Dec. 9, 2004

(30) Foreign Application Priority Data

Aug. 28, 2001 (EP) .................. 01120496

(51) Int. Cl.
*H04J 3/26* (2006.01)
*H04H 20/71* (2008.01)

(52) U.S. Cl. ...................... 370/432; 370/312

(58) Field of Classification Search .................. 370/432
See application file for complete search history.

(56) References Cited

U.S. PATENT DOCUMENTS

| 6,522,880 | B1 * | 2/2003 | Verma et al. ................. 455/436 |
| 7,110,403 | B1 * | 9/2006 | Kavak .......................... 370/390 |
| 2005/0157741 | A1 * | 7/2005 | Wu et al. ..................... 370/432 |

FOREIGN PATENT DOCUMENTS

EP 1071296 A 1/2001

OTHER PUBLICATIONS

Brown Ke et al.,: "RelM: Reliable Multicast for Mobile Networks", Computer Communications, Elsevier Science Publishers BV, Amsterdam, NL, vol. 21, No. 16, Oct. 15, 1998, pp. 1379-1400, XP004141701 ISSN: 0140-3664.

* cited by examiner

Primary Examiner—Kwang B. Yao
Assistant Examiner—Tung Q Tran
(74) Attorney, Agent, or Firm—Roger S. Burleigh (57) ABSTRACT

The invention relates to a method, network node, router, serving node and system for performing multicast data delivery in a mobile telecommunication network. The basic idea is to provide a management of the multicast groups within a mobile telecommunication network. In particular this means to synchronize the multicast group information between routers, like for example the GGSNs. This avoids duplicate multicast data delivery tree allocation for the same multicast group.

17 Claims, 3 Drawing Sheets

Figure 1

2 IP Layers in All-IP Networks:

Application-level; IP e2e between terminals or between terminals and application servers.

Transport level; IP serves as the transport technology, or connectivity, between network nodes.

MULTICAST GROUP MANAGEMENT IN TELECOMMUNICATION NETWORKS

TECHNICAL FIELD OF THE INVENTION

The invention relates to a method, network node, router, serving node and system for performing multicast in a point-to-point telecommunication network.

The present invention is especially applicable in a point-to-point oriented packet-switched telecommunication network.

BACKGROUND

Multicasting is a service that permits sources to send a single copy of the same data to an address that causes the data to be delivered to multiple recipients. Under multicasting only one copy of a message will pass over any link in a network and copies of the message will be made only where paths diverge. From the network perspective, multicast dramatically reduces overall bandwidth consumption, since the data is replicated in the network at appropriate points rather than in the end-systems.

In case the multicast is used in Internet Protocol IP network then it is called IP multicast. With Internet Protocol IP multicast receivers do not need to know who or where the senders are to receive traffic from them and the senders never need to know who the receivers are. Neither senders nor receivers need to care about the network topology as the network optimises delivery. The distribution of the information via the IP multicast is performed on the base of hierarchical connection of the hosts, like for example a tree. Several algorithms have been proposed for building multicast distribution trees, like for example spanning trees, shared-trees, source-based trees, and core-based trees. The descriptions of the corresponding algorithms can be found in "IP telephony: Packet-based multimedia communications systems" O. Hersent, D. Gurle, D. Petit, Addison-Wesley, Harlow, 2000. After the establishment of the distribution tree, the IP multicast routing protocols does the distribution of the information. The detailed description of the corresponding IP multicast routing protocols can also be found in the above mentioned document.

Multicast is a receiver-based concept, it means the receivers join a particular multicast session group by informing a corresponding multicast router and traffic is delivered to all members of that group by the network infrastructure. Therefore within the IP multicast the membership of a multicast session group is dynamic it means that the hosts may join and leave groups at any time. In order to allow hosts on networks to indicate whether they wish to join or leave a particular multicast group there is a protocol called the Internet Group Message Protocol IGMP. This protocol lets the system know which hosts currently belong to which multicast group. This information is required by the multicast routers which need to know which multicast datagrams are to be forwarded onto which interface.

The IGMP is a part of the IP layer and the IGMP messages are transmitted in IP data packets. The version 1 of IGMP is described in RFC 1112 "Host extensions for IP multicasting" S. E. Deering, Aug. 1, 1989, RFC 2236 "Internet Group Management Protocol, Version 2" W. Fenner, November 1997 describes the version 2. The IGMP has been developed for IP version 4. In Internet Protocol IP version 6 there is a similar protocol called Multicast Listener Discovery MLD, which is used for the same purpose as the IGMP. The description of the first version of MLD can be found in RFC 2710 "Multicast Listener Discovery (MLD) for IPv6" S. Deering, W. Fenner, B. Haberman, October 1999. However the messages used in MLD correspond to the IGMP messages. In the following the IGMP will be used as an example. Although this should not be restricted to the IGMP, the functionality of the invention is also given by usage of MLD.

In principle the IGMP uses two basic messages to fulfil its tasks, the membership report and the membership query message, and the following rules are applied. The different versions of IGMP contain additional messages.

A multicast router sends a membership query at regular intervals to see if any host still belongs to any group. The router must send one query out on each interface. The group address in the query is 0 since the router expects one response from a host for every group that contains one or more members on each host. It is also possible to send a membership query for one particular group rather than for all groups. A host responds to an IGMP query by sending one IGMP report for each group that still contains at least one user.

A host joins a group also by sending the membership report. Using the information received by applying the report and the query messages, a table with its interfaces having at least one host in a multicast group is established. After the receiving of the multicast data, the router forwards the data out on each interface, which has at least one member.

Multicasting in Public Land Mobile Networks PLMNs like General Packet Radio System GPRS or Universal Mobile Communication System UMTS requires some further development, for example regarding the mobility of the users and the characteristics of the air interface. Further the communication in a mobile communication networks like for example in UMTS is a unicast communication. The unicast communication is also called point-to-point communication. The point-to-point communication means sending a message from a single sender to a single receiver. In such kind of network, in particular in the core network it is not foreseen to perform a multicast communication. The group communication is implemented by means of a point-to-point communication having a sender transmitting separately packets to each member of the group. For a group with n members, n packets are required on the whole way between the sender and the receivers, instead of one packet when multicasting is used.

In the following an overview of the architecture of the General Packet Radio System GPRS network is given.

The GPRS is the packet-switched enhancement of the Global System for Mobile Communication GSM, which is a circuit switched network. It means that the user can be permanently online connected but has to pay only for the real data transfer. In order to fulfil the new requirements some changes are introduced into the GSM, among other new logical nodes, the Serving GPRS Support Node (SGSN) and the Gateway GPRS Support Node (GGSN) are introduced. The main functions of the GGSN involve interaction with external IP packet networks providing for example connections to Internet Service Providers ISPs. From the external IP network's point of view, the GGSN acts as a router for the IP addresses of all subscribers served by the GPRS networks. The GGSN also exchanges routing information with the external network. Each GGSN serves a number of SGSNs, which can be arranged as a tree with the GGSN as a root of the tree. The SGSN serves all GPRS subscribers that are physically located within the geographical SGSN service area. It forwards incoming and outgoing IP packets addressed to or from a mobile station.

A detailed description of the architecture is to be found in 3GPP TS 03.60 V7.5.0 (2001-01) $3^{rd}$ Generation Partnership Project; Technical Specification Group Services and System Aspects, Digital cellular Telecommunications System (Phase 2+), General Packet Radio Service (GPRS), Service Description, Stage 2 (Release 1998).

The similar nodes with interfaces in-between are also used in the next generation of the wireless networks, in the UMTS as described in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999). In order to distinguish between the functionality of these nodes in UMTS extended names are often used, 3G-SGSN and 3G-GGSN. In the following description it will not be distinguished between the GPRS and the UMTS nodes.

With the introduction of the streaming and of the conversational multimedia services, many new point-to-multipoint services will evolve. Some examples of such services are video-conferencing, whiteboarding, real-time multi-user games, multimedia messaging, virtual worlds. In particular the network operator will provide a big number of different multicast applications within the mobile network.

The introduction of the multicast application on the user layer requires coordination on the transport layer, in particular between the nodes in respect to the multicast data delivery. In PLMNs with multiple GGSNs there is currently no coordination and synchronization mechanism for multicast groups between the GGSNs. It may thus happen that multiple GGSNs in a PLMN are dealing with the same multicast group, resulting in multiple multicast groups and multicast connections. This may happen, if an operator provides several Access Point Names (APNs), which are to be known by the mobile terminals in order to attach to the network's service. The operator can appoint different APNs for different user groups or services, for example a special APN can be assigned for the Multimedia Messaging Service (MMS). In many network topologies this is rather inefficient usage of resources and transmission capacity. Furthermore, if the multicast group info is distributed in the PLMN, the PLMN operator has no means to base any analysis on the group membership in the PLMN. It means the operator can not restrict additional members or base any charging decision on the total group membership in the PLMN.

Figure 1:
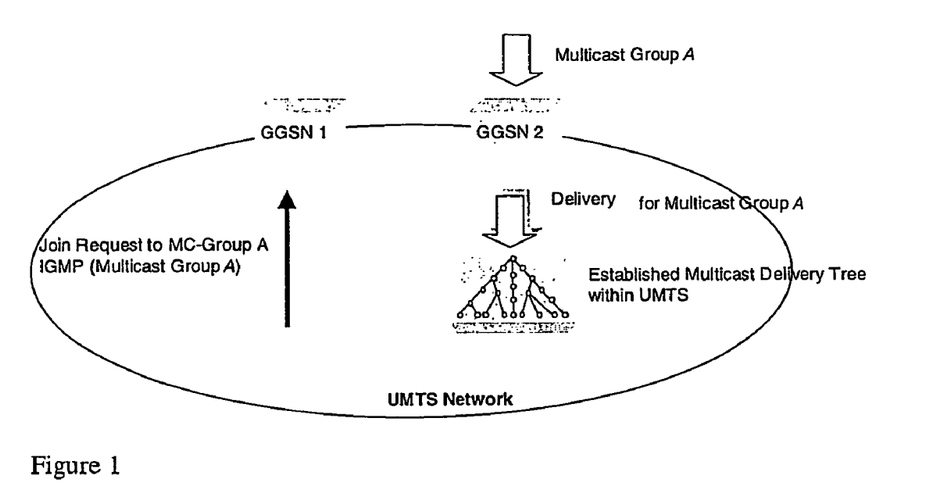
FIG. 1: current solution for provisioning of multicast within the UMTS network.

In the following in respect to FIG. 1 the problem in the existing technologies is described. In FIG. 1 the UMTS Network has two GGSNs, GGSN1 and GGSN2. The GGSN2 supports the Multicast Group A. It means the multicast data for the Multicast Group A is delivered to the GGSN2, and the GGSN2 distributes the data within the UMTS network using the established multicast delivery tree. In case a mobile subscriber being served by the GGSN1 sends the IGMP Join Request for Multicast Group A message a new delivery tree is to be established for the Multicast Group A with the GGSN1 as a root of the tree. As already mentioned in the existing technologies there is no check, whether the multicast flow is already in use within the mobile network. Therefore it may happen, that two different multicast trees are established for the same multicast group within the same network.

SUMMARY OF THE INVENTION

It is an object of the present invention to provide a solution for an efficient provision of multicast data delivery within a mobile telecommunication network.

The basic idea is to provide a management of the multicast groups within a mobile telecommunication network. The mobile telecommunication network provides multicast groups and said network has routers, which receive multicast data and forward said data towards users. The multicast data delivery of a multicast group is performed by means of a multicast delivery tree with a router as a root and with the users as leafs of said tree. The management of the multicast groups within the mobile telecommunication network is performed with the following steps. In the first step a user joins a multicast group by sending towards the router a registration message with a request for joining a multicast group. The requested router checks at the receipt of the registration message, whether said router supports the multicast group. In case of supporting, the requested router performs the registration of the user to the multicast group and the data is forwarded to the user. It can happen that the requested multicast group does not exist in the network. In this case the requested router establishes a multicast data delivery tree. Before establishing a new tree the other routers are queried for estimating a router supporting the multicast group. The querying of the other routers can be either performed by means of sending a multicast message to the other routers. This embodiment is possible, when the routers build a multicast group. Other possibility is to query the routers sequentially by means of point-to-point connections. The estimating of the supporting router can be also done by means of querying a multicast database provided in the network. In case of estimating a router a procedure is started for joining the user to the multicast delivery tree having the supporting router as a root of said tree.

In the following the invention is described in more details in respect to the example of UMTS, wherein the GGSN is a router, the registration message is done by means of an IGMP message and the multicast data delivery tree is established by means of a Transport Level Multicast Group (TLMG).

An advantage of the invention is to synchronise the multicast group membership information between the routers, like for example the GGSNs. This avoids duplicate multicast data delivery tree allocation for the same multicast group.

Connecting the routers via multicast delivery trees or point-to-point connections optimise the transmission and routing efficiency in the network. By means of an additional multicast data base the central administration and analysis of multicast group membership information is achieved. Said centralised administration can be used for example for charging and restriction mechanisms that are not possible in case of distributed multicast groups in the network.

Further the present invention enables the configuration of multicast groups during startup of network nodes and during the registration of a subscriber.

Further it is proposed to have a router adapted to perform a multicast data delivery within a mobile telecommunication network providing multicast groups and said network has routers and said router is one of the routers, which receive multicast data and forward said data to users and the multicast data delivery of a multicast group is performed by means of a multicast delivery tree with a router as a root and with the users as leafs of said tree. This router has means for receiving a registration message with a request for joining a user to a multicast group. This message can be either received directly from the user or from the serving node, in case said node is handling for the user. Means for checking whether said router supports the multicast group are used to check the availability of the requested multicast group in the list of multicast groups being handled by said router. Further the router has means for performing the registration of the user to the multicast group. In case the router does not support the requested multicast group a querying message is sent to the others router in the mobile telecommunication network. This is performed with means for querying other routers for estimating a router supporting the multicast group in order to register the user to the requested multicast group. Means for joining the user to the multicast delivery tree having the supporting router as a root of the tree are used to attach the user in particularly the serving node serving the user to the estimated multicast delivery tree. Further the router has means for receiving a deregistration message with a request for deregistration a user from the multicast group and for performing the de-registration of the user from a multicast group.

The present invention discloses also a serving node adapted to perform a multicast data delivery within a mobile telecommunication network providing multicast groups and said network has routers, which receive multicast data and forward said data to users and the multicast data delivery of a multicast group is performed by means of a multicast delivery tree with a router as a root and with the users as leafs of said tree. The serving node has means for receiving a list with the multicast groups being accessible for the user. This list can be received from a multicast database or from any database supporting the multicast entries of the user. A said serving node has also means for performing the registration of the user to the multicast group. The serving node can either do the registration procedure or said node asks the user that initiates the registration procedure. The serving node receives from the router the address of the multicast delivery tree to which the user is to be attached. With means for joining the user to the multicast delivery tree the user is attached to the router as a root of the tree supporting the multicast group.

Further the invention discloses a system within a telecommunication network adapted to perform a multicast with at least one router and to at least one serving node handling users. The functionality of the router and of the serving node is to be enhanced by the features described further. Further said system has a multicast database administrating entries of the user subscribed to the multicast groups. This database can be organised either central or decentral. It has to be ensured that communication means are provided towards the routers and/or to the serving nodes to guarantee that the entries are actual. Further it is possible to have a communication means-towards the user in case the user has the possibility to change the entries in the multicast database.

DETAILED DESCRIPTION OF THE INVENTION

Figure 2:
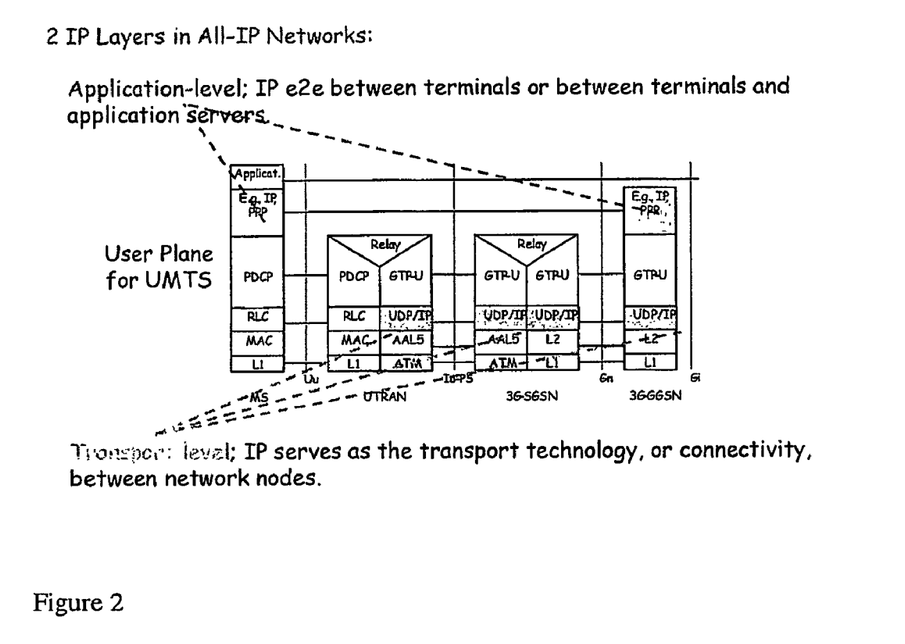
FIG. 2: UMTS protocol architecture.

In the following in respect to FIG. 2 the architecture of the UMTS network is described. The FIG. 2 shows a mobile station MS, which communicates over the Uu interface with an access network UTRAN. The Iu-PS interface connects UTRAN with 3G-SGSN, which communicates over the Gn interface with the 3G-GGSN. FIG. 2 provides an overview of the different protocol stacks in the different nodes used in the UMTS. The following description concentrates merely on two IP layers, depicted as IP/PPP and UDP/IP. In the FIG. 2 the other protocols are mentioned due to the complementary reasons. As a result of the function of the GGSN as a router and as an interface to the external networks the IP layer below the application layer has been introduced. Due to the restriction of having an IP network between the GGSN and the SGSN an IP logical connection is introduced as a transport mean, below the GTP-U layer.

Therefore in respect to FIG. 2 there are two IP layers, in the following described as an application IP and a transport IP layer. The application IP layer is located in the protocol stack directly below the application protocols, Applicat., and connecting the mobile station and the 3G-GGSN. This IP layer is transparent to the packet switching network, a direct line going from the mobile station MS to the 3G-GGSN depicts this. The second IP layer is the transport IP layer used for the transmission between the SGSN, GGSN and UTRAN. The payload traffic is transported across the Gn encapsulated in an application-specific tunnelling protocol, the GPRS Tunnelling Protocol GTP, which is an example of a transport layer protocol for tunnelling. GTP packets use UDP as a transport protocol. However there are different tunnelling protocols, which are responsible for building a tunnel. The GTP is merely an example.

Further in FIG. 2 included are not the Home Location Register HLR and/or the Home Subscriber Server HSS, which are also relevant for the invention. The HLR/HSS is a centralised network database that stores and manages all mobile subscriptions belonging to a specific operator. The HLR is integrated in the GSM networks. The HSS is used for example in WCDMA networks, like the UMTS. In the following, the term HLR is used. However the invention is not restricted only to the HLR.

In order to improve the method of the present invention it is proposed to build multicast groups with the network nodes as members of said groups. The establishment and the configuration of pre-defined multicast groups might be performed during the start-up of nodes. It means the operator of the network can define for example that all GGSN build a multicast group. With this solution the query procedure between the GGSNs is simplified, because only one message is to be sent out to reach all members of the GGSN multicast group. Optionally, if a GGSN has registered a first member or de-registered a last member of a multicast group it informs all other GGSNs about this. Alternatively or in addition the GGSN updates the MC group database. Any kind of pull- or push-based synchronization can be applied between the GGSNs.

Instead of multicasting the info between connected GGSNs by means of the TLMG, also dedicated point-to-point connections between the GGSNs may be used to transfer the multicast info only by means of single copies per link.

In the following the invention is described in respect to FIG. 3, which shows the configuration steps for multicast groups in mobile networks like UMTS.

Figure 3:
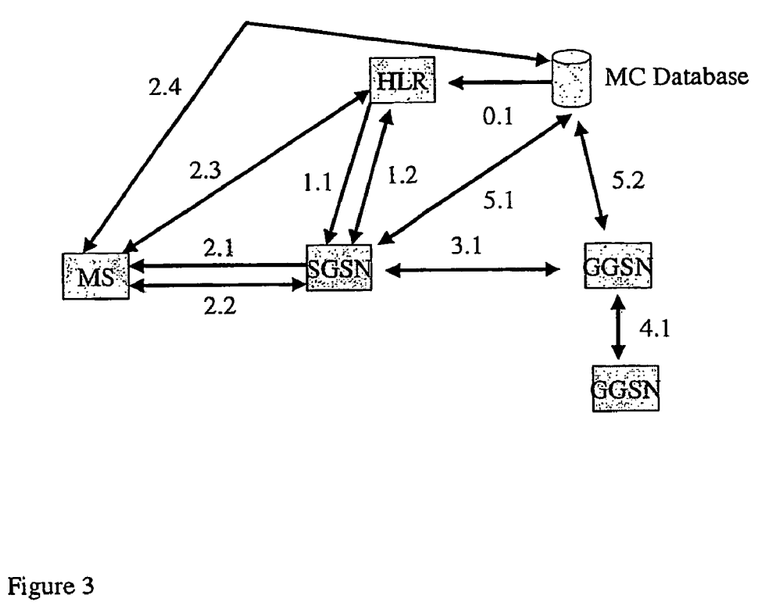
FIG. 3: method steps within the UMTS according to an embodiment of the present invention.

In the FIG. 3 the UMTS nodes, which are relevant for the invention are shown. These nodes are the mobile station MS, the SGSN, two GGSNs an HLR and a data base MC Database. The arrows between the nodes show the information flows between the certain nodes, wherein the arrows are labelled by means of two digits x.y, and the arrows with the same x and different y denote alternatives.

In the first step, 0.1, a management system configures the subscriber records, which can be located for example in the HLR or in a dedicated database. In case a mobile subscription includes the pre-subscription to specific multicast groups, the multicast group addresses are included in the subscriber record. Further the network provides a multicast database, MC database. The MC database is located for example in a central node or optionally co-located within the HLR, contains a list of all multicast groups, which are supported by the mobile network and which can be part of a subscriber's record. The MC database may also contain a list of all subscribers of each multicast group. This may be also a list of those subscribers, which are pre-subscribed to a multicast group. In a more advanced implementation, the MC database may contain further multicast group related information. For example a multicast group can have defined the Quality of Service QoS requirements in order to get the dedicated QoS per multicast group. Another information can be the security related information, like for example the method for key description or the charging/tariff related information. The tariff for the transfer of multicast data can differ depending on the number of multicast user it means the tariff is different if there are at least 10 members or if there are at least 20 members. Further the priority can be defined for the multicast groups. For example service multicast group receives a higher priority then a commercial multicast group in case of shortage of resources. The additional information is also stored in the multicast database.

The step 0.1 can be triggered by either the multicast database or by the HLR. Any kind of negotiation and verification signalling messages can be exchanged between the multicast MC database and the HLR to keep the data in both databases consistent. The MC database can store the multicast groups supported by the PLMN or by the operator. The differences can occur, when a PLMN temporally support a multicast group, which in generally does not belong to the pre-subscribed multicast groups of the operator. This has to be considered regarding the different roaming cases. In an advanced implementation, all the pre-subscribed multicast groups have to made available after performing the roaming.

The subscriber registers to the network by means of the usually applied registration procedure. In GSM network said procedure includes the so-called IMSI attach procedure, which leads to the activation of the subscriber in the network, in particular in the subscriber's records in the HLR. It means the subscriber server like the HLR gets the registration information so that during the registration of a subscriber, the list of subscribed multicast groups, which is stored in the MC database, is sent to the SGSN. This is shown in FIG. 3 in step 1.1. Besides the list of subscribed multicast groups, also priority related information per multicast group might be transmitted. If a subscriber has registered for multiple multicast groups, the network may decide to only activate the registration for the high priority multicast groups, depending on the network resource situation, like for example time of day. Alternatively to step 1.1, the SGSN may query the list of subscribed multicast groups for a subscriber from the HLR after the normal registration of a subscriber. This is shown by means of step 1.2.

In case the SGSN receives the list consisting of the possible multicast groups. Said list is sent to the user in order to subscribe to certain multicast groups.

The step of sending the list to the user is shown in FIG. 3 in step 2.1. The SGSN sends the list of subscribed multicast groups to the user MS and the user MS joins the listed multicast groups. This requires, besides the transmission of the list of subscribed multicast groups, also functionality in the mobile station to process this list. In one embodiment the user joins each of the listed multicast group. In other embodiment of the present invention the subscriber does not activate all of these multicast groups in all cases in the corresponding database. For that a negotiation process between the subscriber and the mobile station can be used to temporarily activate or de-activate multicast group subscriptions. Said negotiation can be in particular very useful in case of roaming, it means in cases, when the user changes the PLMN. The result of the negotiation is consequently sent to the corresponding database, wherein the mobile station sends the result to the SGSN, which is responsible for forwarding the message to the corresponding database, either the HLR or the MC database.

In a further embodiment it is foreseen to change the subscriber records. For this aim an additional registration/de-registration and activation/de-activation procedures exists between the subscriber and the subscriber server, like the HLR to allow the direct access to the MC group information available in the HLR from the mobile station. This is shown in step 2.3. With this method it is possible for the user to change his/her profile stored in the HLR, so that the user influences the entries in the list of the multicast groups available for the user. It means the list is established individual by the user and not provided by the PLMN as it is the case in step 2.1. For performing this procedure the GSM/UMTS supplementary services implemented on the signalling interface, like for example the MAP (Mobile Application Protocol) or the Internet-based subscription management on a data channel can be applied in order to make possible the editing of the records of the subscribed multicast groups via the mobile phone. The user can for example perform the registration or the deregistration to or from a multicast group.

In other embodiment it is foreseen to allow the direct access to the multicast group information available in the multicast database from the mobile station. Thereby the HLR can be bypassed and changes can be done directly in the MC database. This might be advantageous to avoid additional load on the HLR. This is for example achieved by means of a direct access as it is shown in step 2.4.

As an alternative, which is shown in step 2.2 the SGSN joins the user MS to each of the groups in the list of subscribed multicast groups and informs the MS about this. The advantage of this alternative is that the resources on the air interface are saved. The arrows going in both directions show the interaction between the SGSN and the MS. By means of the steps 3.1, 4.1 and 5.1 the list of subscribed multicast groups may be changed.

The steps 0.1 to 2.3 are not performed in case a user is already registered in the network and after the registration the user decides to join a multicast group. It means a user can either have a pre-subscription to multicast groups, which is done, for example, by the purchase of a SIM-card or the user can register and de-register dynamically to a multicast group.

In this case only the following steps are to be performed. Further this can result that the entries in the MC database are not updated and no interactions are performed with the MC database.

After finishing the subscription procedure to the certain multicast groups, in the next step, 3.1, the joining to the chosen multicast groups is performed. For this aim the SGSN sends the IGMP join message, which can be generated either by the mobile station MS or by SGSN, to the GGSN, step 3.1.

Additional the SGSN may check with the MC database whether the multicast groups included in the subscribed multicast group list of subscriber are still valid. This is depicted in the FIG. 3 in step 5.1. Possible results of this query are for example the multicast group is supported by PLMN or the multicast group is currently not available in PLMN or the multicast group is not valid just to avoid the problem if the data in the HLR is not updated in time or the multicast group is blocked, because for example the content which is transmitted over this MC group shall not be transmitted over the operator's network for legal, social, or other reasons. This check is not mandatory and it has not to be performed each time a list of subscribed MC groups is received at the SGSN in case the SGSN keeps record of all previously checked MC groups.

With the receipt of the join message the GGSN starts to perform some checks and verifications. The GGSN may check with the MC database whether the MC group, which shall be established, is still valid, step 5.2. The possible results of this query are the same as it was mentioned in the step 5.1.

Further, the GGSN may check after startup which multicast groups has to be established directly. Optionally, the step 5.2 includes the retrieval of the list of nodes, which are mandatory members of each multicast group and the GGSN needs to force those nodes to join. Alternatively, each node, which may be part of a multicast group in UMTS, needs to perform step 5.1 in order to retrieve the list of multicast groups it has to join. Further the GGSN checks in step 4.1 whether the requested multicast group is already served by another GGSN. Therefore it sends a multicast query to the other GGSNs, preferably via a multicast group, which includes all GGSNs. Any selection criteria such as delay distance or bandwidth may be used to only query a subset of all GGSNs in the PLMN. It is also possible that a GGSN, which is requested, in the following this GGSN will be called anchor GGSN, contacts the MC data base in order to estimate the GGSN serving the requested multicast group. This embodiment works in case, in which every GGSN, which has established a multicast group within the PLMN informs the MC database, which changes the corresponding entry in the records. It means an administration interface is to be implemented in the MC database. In case the requested multicast group is not supported by any GGSN, the anchor GGSN queries the other GGSN or establishes directly a new multicast group within the network and inform the MC data base in order to update the corresponding entries.

The transmission of the data between the GGSN and towards the subscriber is done by means of a so-called TLMG. Within this solution a transport level multicast group TLMG tunnel on the transport layer from the GGSN to the SGSN is built in order to transfer the multicast data over said tunnel to users registered to a multicast group. The TLMG tunnel is established by means of a transport layer protocol for tunnelling like the GPRS Tunnelling Protocol GTP and said tunnel is assigned to the multicast group to which the user is registering. It means the incoming multicast data sent on the application IP layer is redirected to the transport IP layer and transported over the TLMG tunnel. The establishment of the GTP tunnel is described in the further part of the description. In a mobile environment, like the UMTS the TLMGs on the transport layer can be implemented by using IP multicast for efficient transmission in the IP network between the SGSN and GGSN with the option to extend it towards the RNC/BSC or even further to the MS. Alternatively, a pre-configured multicast transmission for parts of a network that is basically point-to-point oriented may be used. It means a TLMG is not established every time a user is registering to a new multicast group, but the TLMG are pre-established for a certain multicast groups or with certain parameters, like for example certain QoS parameters. In the last case it can be advantageous to multiplex on one TLMG the data flows of different multicast groups, which fulfils the requirements of the parameters of the pre-established TLMG. However this is not the major feature of the present invention and therefore it will not be treated in more details.

Figure 4:
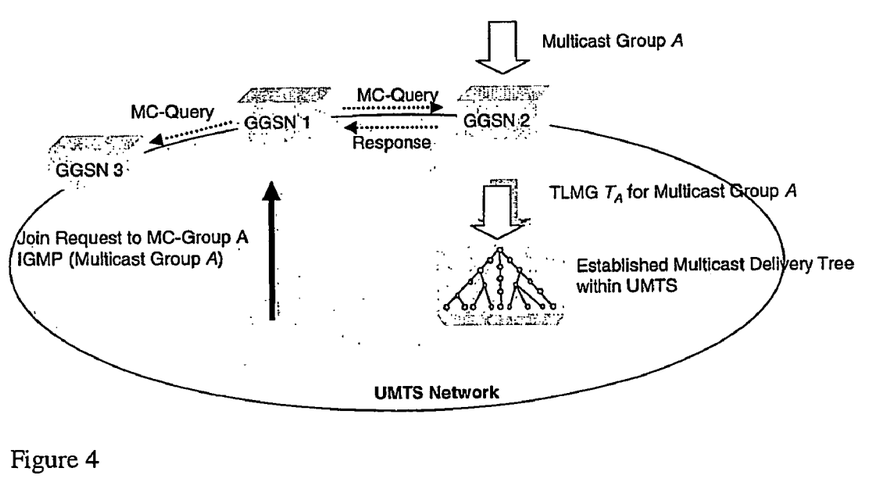
FIG. 4: schematic presentation of the message exchange between the GGSNs according to the invention.

In the following the procedure performed in step 4.1 is described in more details in respect to FIG. 4. The structure of FIG. 4 is similar to the structure of FIG. 1. The differences are the interfaces between the GGSNs, on which the information exchange is performed.

At first the GGSN1 receives an IGMP message from the Ms as it was described above in respect to step 3.1. The receipt of the IGMP message is shown in FIG. 4 by means of an arrow going to the GGSN1. In case of receiving an IGMP join message the GGSN first checks, if a new TLMG for the requested multicast group is needed. The requested multicast group identification is part of the IGMP join message. For this aim the GGSN searches its own local database for the multicast group and in case said multicast group is not supported the supporting GGSN is estimated. This can be done by querying the MC-database or by sending a query message to the other GGSN of the PLMN. The query message can be sent by means of the multicast transmission or by means of the point-to-point transmission. The most advantageous way of sending the query message is by means of the multicast transmission. This will be called in the following Multicast Group Query or MC-Query. This is shown in FIG. 4 by sending the MC-Query to GGSN2 and GGSN3. The MC Query may be send on a TLMG, which is dedicated for communication between GGSNs, and which has been set-up beforehand during or after the configuration of the GGSNs, and either all or a subset of GGSNs are members of this multicast group. This pre-established and pre-configured TLMG is further referred as Config-TLMG. Since the TLMG is pre-established it is not required to exchange the signalling information, for example by means of the GTP protocol, as it is described below in respect to the registration procedure of a user. A GGSN attaches to the Config-TLMG by sending directly an IGMP join message. The Query message, which is sent by means of the Config-TLMG, uses as an example the UDP protocol as the transmission protocol. In case of a point-to-point connection between the GGSNs the TCP protocol can be used. The TCP is a transaction-oriented protocol, in other words a protocol, which uses the request and responses messages for performing a transmission. In the above described embodiment the GGSNs form a GGSN multicast group. It is of course possible that a router multicast group is formed by any network nodes of the mobile telecommunication system.

In case the GGSN receives the message that none of the GGSNs supports the multicast group a new dedicated TLMG is established from the requested GGSN towards the users. If a GGSN has already created a TLMG for the multicast group, it sends a response to the requesting GGSN. In FIG. 4 sending a Response message from the GGSN 2 to the GGSN1 shows it. Said Response message includes the TLMG address which is to be used to forward the multicast data towards the user and optional the address of the GGSN. Additional, the responding GGSN sets a flag in the database entry, which indicates that other GGSNs serve members of this group. This is necessary for the de-registration process, if not all members of the multicast group are stored in one central database, it means the database is de-centralised and the other GGSNs are also to be informed in case of de-registration. If all members of the multicast group are stored in one database, then this database is to be updated. The requesting GGSN stores the TLMG and optional the address of the responding GGSN in its local database. The GGSN address may become necessary to indicate to the anchor-GGSN that all members are de-registered. In the FIG. 4 an example is shown, in which the GGSN2 supports the multicast group A. It means the data of the multicast Group A is delivered to GGSN 2 and forwarded to all users by means of the TLMG T(A) for Multicast Group A, wherein the TLMG has a structure of a Multicast delivery tree. However it has to be ensured that the SGSN, which serves the user requesting for joining to the Multicast Group A and being handled by the GGSN1 becomes part of said multicast delivery tree. This procedure is described in the following in respect to FIG. 5.

Figure 5:
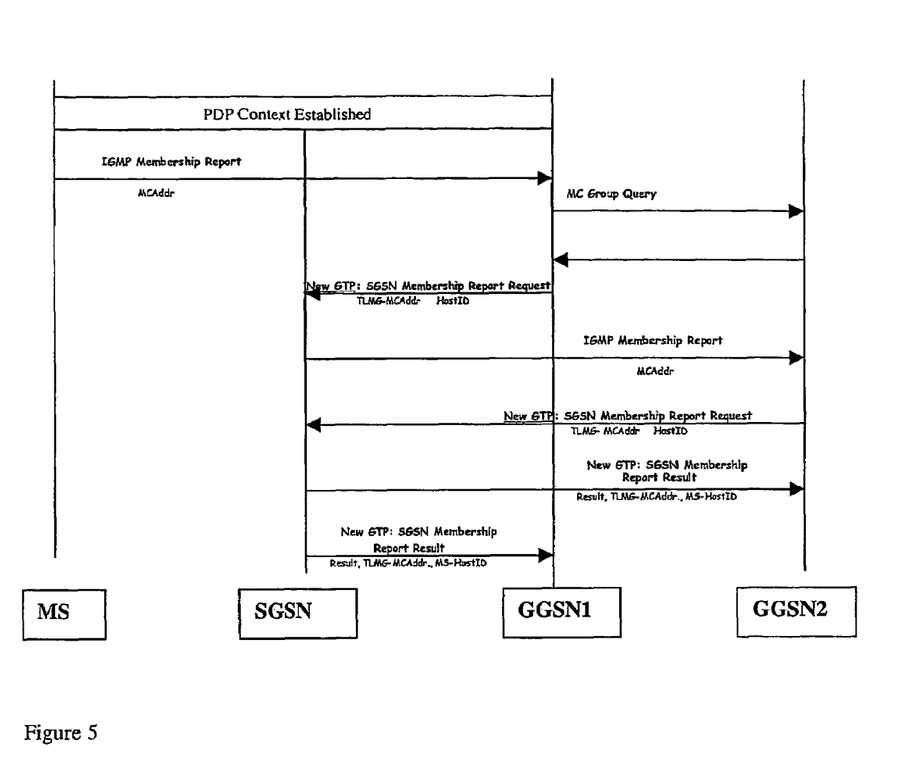
FIG. 5: a time sequence of a signalling flow between the UMTS nodes according to the invention.

The FIG. 5 shows a time sequence of the sent messages between a mobile Station MS, a SGSN, a GGSN1 and a GGSN2. An arrow indicates a sent message. Above an arrow the name of the message is given and below the arrow the main parameters of the corresponding message are listed.

At first a GTP tunnel is established. This is done during the so-called PDP-Context activation. The PDP context activation is like logging on the external IP network. For this aim a mobile subscriber identity is associated with an IP address. During the PDP Context Activation a tunnel with an identity, the so-called TID is created between the SGSN and GGSN for the PDP context. During this procedure also a Quality of Service QoS negotiation takes place between the MS and the SGSN/GGSN. Over the GTP tunnel the IGMP message is sent to the GGSN1 with the MCAddr., which is the multicast address of the multicast group, which the user wants to join. In case the multicast group is not supported by the GGSN1 a query is sent to the other GGSNs. The format of the message depends on the delivery method, for example Config-TLMG or a point-to-point connection. For example in case of TLMG the multicast address is to be included and the used protocol can be the UDP. In case of the point-to-point connection the address of the queried GGSN is included in the message and transported for example by means of the TCP protocol. The GGSN1 receives as an answer the response message from the GGSN2 with the TLMG-address and optional with the GGSN2 address. The format of the response message depends again on the delivery method. The GGSN1 sends an answer to the SGSN, New GTP: SGSN Membership Report Request with TLMG-MCAddr., which is the address of the TLMG and with MS-HostID, which is the identification of the user requesting for join the multicast group. The SGSN has to have this identification of the user to send the received data to the appropriate receiver. This message can include also the address of the GGSN2. The SGSN has to have the GGSN2 address in order to get in contact with this node. However this address can be also estimated for example by means of a resolution protocol, which is used in a tree to find out a root of the tree. It means the SGSN can find out the address of the GGSN2 by using the resolution protocol and the address of the TLMG in order to find the GGSN being the root of tree. Once the SGSN has the address of the GGSN2 it sends an IGMP Membership address to the GGSN2. The GGSN2 sends a New GTP: SGSN Membership Report Request with TLMG-MCAddr to the SGSN. It might be that the SGSN performs some verification. As a result the message, New GTP: SGSN Membership Report Result with TLMG-MCAddr is sent to the GGSN2. With this step the SGSN becomes part of the tree with GGSN2 as the root for said MC group. Further the SGSN sends a New GTP: SGSN Membership Report Result with TLMG-MCAddr to the GGSN1, so that in case of a registration of a new user to the same multicast group a query message to the GGSN2 is avoided and also it is not required to perform the step necessary for joining the SGSN to the TLMG. In this case the SGSN sends directly the address of the TLMG and the MS-HostID of the user to the GGSN2.

In case the query message to the GGSNs results in a negative answer, it means none of the GGSN supports the multicast group a new dedicated TLMG on the transport IP layer for the multicast arriving on the application IP level is established from the GGSN1 with the SGSN as a member of the TLMG tree. This procedure is described in the following without a figure. First the GGSN1 allocates a multicast address from the core network's address space. In the following it will be called the Multicast IP Address of the TLMG or alternative TLMG-MCAddress or simply TLMG address. In order to create the proper TLMG, the GGSN1 can take the negotiated Quality of Service QoS requirements from the PDP context into account. It is also possible to just provide the TLMG address to the SGSN, as described below and create the logical TLMG in the GGSN1 only upon reception of a positive result from the SGSN.

The GGSN1 informs the corresponding SGSN that it has mobile stations registered to a multicast group by means of for example enhanced GTP protocol. A new GTP message, SGSN Membership Report Request can be used. It is also possible to use existing message, for example an enhanced Packet Data Unit PDU notification message on the UDP connection for this purpose.

The SGSN Membership Report Request message contains information required for the replication of the multicast stream into multiple unicast streams in the SGSN, like for example the TLMG-MCAddress and the MS-HostID, which is the Host ID of the MS that is registered to the Multicast Group. Thus for the multicast group traffic the GGSN ignores the tunnel that is already established for that MS by the SGSN during the PDP context activation and rather uses TLMGs, which form a multicast delivery tree. This kind of multicast delivery tree will be called in the further description a TLMG delivery tree.

After receiving the SGSN Membership Report Request message the SGSN makes Multicast Group MC Membership Verification. In particular it means that the SGSN can do subscription check or charging accounts check to determine whether the mobile station is allowed to register for any or for this specific multicast group. The result of the verification is included in SGSN Membership Report Result message. In case of a negative verification result, the SGSN will return a SGSN Membership Report Result message, which can be accompanied by a cause indication in case of a negative result, back to the GGSN, indicating that the multicast verification has not been successful and that the mobile station should not join the application-level multicast group. In case of a positive verification result, this message indicates a successful outcome to the GGSN. Furthermore, the SGSN then stores the relation between the TLMG-MCAddress and the MS-HostID, for example by simply adding the TLMG-MCAddress to the existing PDP-context information for that MS, to be able to replicate the data and forward these to the corresponding hosts at reception of the multicast data stream.

Upon receipt of the SGSN Membership Report Result, the GGSN returns a Membership Report Accept or Membership Report Reject, possibly containing a cause indication, depending on the outcome of the verification. This is a new message, which is not specified in IGMP. It is also feasible to send an existing error message only in case of a negative result. Otherwise, when the result of the membership report is positive, none information message is sent back.

In case of a successful SGSN Membership Report Result, the counter for the number of the users for the multicast group and consequently for the TLMG is stepped and/or the MS-HostID is added to the multicast group.

Whenever a SGSN has a first MS that registers to a multicast group and the SGSN itself is registered to the TLMG and added to the TLMG multicast delivery tree, then the SGSN sends an IGMP Membership Report message to the GGSN. Furthermore, the IGMP Membership Report message uses the negotiated Quality of Service QoS received during the PDP context activation for selecting the correct QoS path from the SGSN to the GGSN. Existing multicast routing tree protocols can be used for this purpose.

The GGSN takes care of the multicast membership propagation via the backbone network over the Gi-interface by sending the IGMP Membership Report. The membership propagation to neighbouring routers is only required to indicate that there is at least one member of the corresponding multicast group in the local network, for example PLMN, which wants to receive multicast data. Therefore this propagation is only required for the first multicast group member within the PLMN.

It was mentioned that the GGSNs form a multicast group, which is connected by means of the TLMG. It means the operator can establish a multicast group with all GGSN as members of this multicast group to query all GGSNs for the GGSN supporting the requested multicast group.

In another embodiment of the invention the GGSN, which is serving the particular multicast group regards the other GGSNs as SGSNs with group members. In other words each of the said other GGSNs becomes leave of a multicast delivery tree and logically it is located on the same layer within the tree as the SGSNs. In that case this GGSN must stay in the loop until no group members are active in the PLMN anymore, also when this GGSN itself does not have any active group members left.

In case the anchor GGSN does not have any group members left, it may request the other GGSNs to select a new anchor and after confirmation that a new anchor GGSN has been selected, may leave the MC group itself.

For error recovery, all receiving GGSNs check their own tables for the Multicast Group and the TLMG. In case multiple GGSNs serve the same multicast group, then all GGSN, which are not anchor GGSN for this multicast group, may release or may mute (not forwarding packets from the Internet) the TLMG.

A GGSN can also decide to create a new TLMG, depending on the query result. This is especially the case if it is selected as new anchor GGSN. Some rules may reflect operator's choices on which GGSN shall serve which MS group.

The invention claimed is:

1. A method for performing multicast data delivery within a mobile telecommunication network having multicast groups, said network including routers that receive multicast data and forward said data to users, wherein the multicast data delivery of a multicast group is performed by means of a multicast delivery tree with a serving router as a root and with the users as leafs of said tree, wherein within the mobile telecommunication network a management of the multicast groups is performed according to the following steps:

a joining message with a request for joining a user to a multicast group is sent to the serving router;

the requested serving router checks at the receipt of the joining message, whether said serving router supports the multicast group;

in case of supporting the multicast group the requested serving router performs the joining of the user to the multicast group;

otherwise the requested serving router queries other routers to determine a supporting router for the multicast group in order to join the user to the requested multicast group; and, a procedure is started for joining the user to the multicast group by attaching the user to the multicast delivery tree having the supporting router as a root of the tree.

2. The method recited in claim 1, wherein the mobile telecommunication network provides a list of multicast groups supported by said network and said list is stored in a multicast database.

3. The method recited in claim 2, wherein the multicast database administrates entries of the users subscribed to the multicast groups and further multicast related information.

4. The method recited in claim 1, wherein the list of multicast groups of the user is provided to the user during a network's attach procedure and the user registers to the multicast groups by sending to the router the registration message with a request for joining.

5. The method recited in claim 1, wherein a serving node, which serves the user registered to its serving area performs the registration of the user to a multicast group by sending to the router the registration message with a request for joining.

6. The method recited in claim 2, wherein the telecommunication network provides a subscriber server for storing entries relating to the registration of the user to the multicast group.

7. The method recited in claim 6, wherein information exchange is performed between the subscriber server and the multicast database for verification and for synchronization of the entries.

8. The method recited in claim 7, wherein the user has an interface in a mobile terminal to modify the entries relating to the multicast registration and de-registration in the subscriber server and in the multicast database.

9. The method recited in claim 1, wherein the registration message with the request for joining a multicast group is performed by means of an IGMP message.

10. The method recited in claim 1, wherein in the mobile telecommunication network a router multicast group is pre-established and pre-configured with the routers as members of said group.

11. The method recited in claim 10, wherein the query to the other routers is performed by means of a multicast transmission performed to the routers being members of the router multicast group.

12. The method recited in claim 1, wherein the query to the other routers is performed by means of a point-to-point connection.

13. The method recited in claim 1, wherein the query to the other routers is performed by means of querying a multicast database for the router supporting the requested multicast group.

14. The method recited in claim 1, wherein data transmission of the multicast group to a user registered to a multicast group is done on a transport layer by means of a transport level multicast group tunnel established by means of a transport layer protocol for tunnelling.

15. The method recited in claim 1, wherein in case the router supporting the requested multicast group is estimated by a procedure for connecting the user to said router, wherein an identifier of the multicast delivery tree being used for the multicast data delivery for the requested multicast group is used to register the serving node of the user to said tree.

16. A serving router for performing multicast data delivery within a mobile telecommunication network having multicast groups, said network including routers that receive multicast data and forward said data to users, wherein the multicast data delivery of a multicast group is performed by means of a multicast delivery tree with said serving router as a root and with the users as leafs of said tree, said serving router comprising:

means for receiving a joining message with a request for joining a user to a multicast group;

means for checking whether said serving router supports the multicast group;

means for performing, in case the serving router supports the multicast group, the joining of the user to the multicast group;

means for querying other routers, in case the serving router does not support the multicast group, to determine a supporting router for the multicast group in order to join the user to the requested multicast group;

means for joining the user to the multicast delivery tree having the supporting router as a root of the tree; and, means for receiving a deregistration message with a request for deregistration of a user from the multicast group and for performing the deregistration of the user from the multicast group.

17. The serving router recited in claim 16, further comprising:

means for receiving a list with the multicast groups being pre-configured for the user;

means for performing the registration of the user to a multicast group; and means for joining the user to the multicast delivery trees having for each tree a router supporting the multicast group as a root of the tree.

* * * * *